United States Patent [19]

Brockelsby

[11] 3,939,729

[45] Feb. 24, 1976

[54] PAWL AND RATCHET CONSTRUCTION FOR HAND WINCH

[75] Inventor: Norman D. Brockelsby, Grand Island, Nebr.

[73] Assignee: Dutton-Lainson Company, Hastings, Nebr.

[22] Filed: Oct. 3, 1974

[21] Appl. No.: 511,657

[52] U.S. Cl................. 74/575; 74/577 M; 188/82.2; 188/82.4; 188/87.7; 254/186 HC

[51] Int. Cl.².......................................... F16D 49/00

[58] Field of Search....... 74/577 M, 577 R, 575, 97, 74/526, 535; 188/82.2, 82.4, 82.7, 82.74, 82.77; 254/186 HC

[56] References Cited

UNITED STATES PATENTS

| | | | |
|---|---|---|---|
| 91,072 | 6/1869 | Bean | 74/577 M X |
| 2,892,351 | 6/1959 | McCarty | 74/526 X |
| 2,943,710 | 7/1960 | Lindmark | 74/97 X |

*Primary Examiner*—Samuel Scott
*Assistant Examiner*—F. D. Shoemaker
*Attorney, Agent, or Firm*—Molinare, Allegretti, Newitt & Witcoff

[57] ABSTRACT

The present invention is related to an improvement in a double-acting ratchet and pawl for controlling the operation of a hand winch. The pawl is pivotally mounted and engageable in two different positions with a driving gear which in turn is engaged with a driven gear operably connected to a winch reel. The improvement of this invention is primarily related to the pawl design and mounting and operation means therefor. With the design of the present invention, the pawl may be pivoted into any one of three principal locations corresponding to forward winch drive, reverse winch drive, and free-running winch drive. A latch plate holds the pawl fixedly in the desired position. A handle is provided for operating the pawl and a spring compressed against the handle operably holds the pawl against the latch plate. The pawl and the handle are pivotally connected on a shaft and mounted pivotally with respect to one another. A coiled spring connects the handle to the pawl for moving the pawl when the handle is operated.

10 Claims, 7 Drawing Figures

PAWL AND RATCHET CONSTRUCTION FOR HAND WINCH

BACKGROUND OF THE INVENTION

The present invention is related to an improvement in a pawl construction and mounting means therefor for use in controlling the operation of a hand operated winch.

A double-acting pawl and ratchet arrangement having three positions corresponding to forward, reverse and free-running movement of the winch is well known in the prior art. In one known construction, the pawl includes two gear-engaging teeth alternately engageable with a driving gear for permitting the gear to be rotated either clockwise or counterclockwise depending on which of the pawl teeth is engaged against the driving gear. Integrally connected with the teeth of the pawl is a handle for operating the pawl to move the teeth into and out of engagement with the driving gear. A spring having cam surfaces is provided adjacent the pawl and engages with two cam followers rigidly connected to the pawl in order to maintain the pawl in a fixed position. When one of the two pawl teeth engages against the driving gear, the winch may be operated only in the forward direction; when the other of the two teeth engages against the driving gear, the winch is operable only in the reverse direction; and when the pawl is pivoted into neutral position, the winch can be operated freely in either the forward or reverse direction.

While the ratchet and pawl arrangement of the prior art is generally effective for its intended purpose of governing the operation of the winch, it does have some drawbacks. For example, problems result from the relatively high mass of the pawl which includes the engaging teeth, connecting members, cam followers, and a handle portion which extends outwardly away from the engaging teeth. The relatively high mass of this pawl results in a rougher and more discontinuous operation than is desirable since, with high speed gear travel, the inertia of the pawl prevents it from closely following the driving gear. Also, the high mass of the pawl results in higher acoustical noise levels than those produced by the pawl of the present invention.

Another disadvantage of this pawl is that it can be unintentionally disengaged from the driving gear of the winch. When a sufficient force is exerted by the pawl, the cam followers sometimes ride out of the desired location against the cams. Having moved into the new location, the cams and cam followers tend to hold the pawl in this location, thus requiring the manual re-engagement of the pawl. Likewise, when the pawl is in the neutral, free-running position, permitting the winch to be operated in the forward or reverse direction, it can be accidentally engaged, possibly causing damage to the winch gears and/or the pawl.

SUMMARY OF THE INVENTION

The present invention is directed to an improvement in the pawl construction provided for operation in conjunction with a winch. In the preferred embodiment, the improved pawl of this invention is adapted for use with a winch having a winch reel, a driving gear, a driven gear engaging with the driving gear and connected to the winch reel, and a ratchet and pawl apparatus for permitting forward, reverse, and freerunning movement of the winch. The pawl includes first and second ratchet-engaging members and is pivotal into a first position, permitting only forward movement of the winch, and into a second position, permitting only reverse winch movement.

The improved ratchet and pawl arrangement of the present invention generally comprises means for pivoting the pawl into the first and second positions, a latching means for maintaining the pawl-pivoting means in a fixed position when in contact with the pawl-pivoting means, and means for biasing the pawl-pivoting means against the latching means so that the pawl is maintained in the desired position until deliberate force is exerted against the biasing means on the pawl-pivoting means sufficient to overcome the force of the biasing means.

The invention also includes a new arrangement for engaging the pawl with the driving gear. The pawl-pivoting means is a handle, and the pawl and pawl handle are pivotally mounted adjacent the driving gear and are pivotal in relation to one another. A connecting means which, in one embodiment, takes the form of a spring, is provided for flexibly connecting the pawl to the handle so that movement of the handle causes movement of the pawl and also so that the pawl may be biased into desired engagement with the driving gear. A latch plate is provided for engaging with the pawl handle and holding the handle and the pawl in a desired, fixed position.

An object of the present invention is to provide a new and improved ratchet and pawl arrangement particularly adapted for use with a winch. Another object of the present invention is to provide such a ratchet and pawl arrangement which cannot be accidentally moved into or out of engagement with the winch gears.

Still another object of the present invention is to provide a ratchet and pawl arrangement in which the pawl may be continuously biased into engagement with the driving gear when desired.

A further object of the present invention is to provide a ratchet and pawl arrangement which will operate smoothly and with less noise than the ratchet and pawl arrangements of the prior art.

A still further object of the present invention is to provide a pawl which may be operated by an operator remote from the winch gears.

Another object of the present invention is to provide a new and improved ratchet and pawl arrangement which may be operated with increased safety from damage to the apparatus and from injury to the operators of the winch.

These and other advantages and features of the present invention are more fully set forth in the detailed description of the preferred embodiment of this invention.

BRIEF DESCRIPTION OF THE DRAWINGS

There follows a brief description of the drawings showing a prior art construction and the preferred embodiment of the present invention in which like numerals refer to like elements and in which.

DETAILED DESCRIPTION OF THE PREFERRED EMBODIMENT

Figure 1:
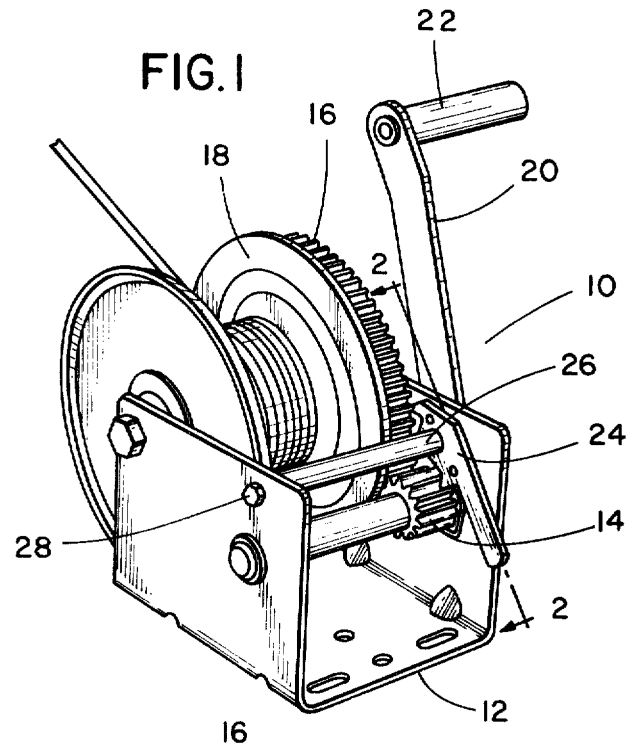
FIG. 1 is a side perspective view of a hand operated winch and ratchet and pawl arrangement of the prior art.
Figure 2:
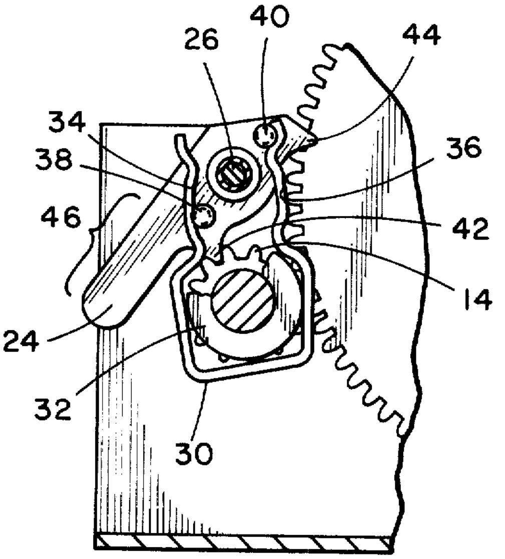
FIG. 2 is a partial side cross-sectional view of the ratchet and pawl arrangement of FIG. 1 taken substantially along the lines 2—2.

This invention may best be understood by reference to a prior art ratchet and pawl assembly adapted for use with a hand winch. Referring now to FIGS. 1 and 2, showing the prior art construction, a hand winch 10 is shown, having a bracket 12. A driving gear 14 and a driven gear 16 are rotatably mounted on the bracket 12. The driven gear 16 is connected to operate a reel 18 of the hand winch 10. A winch arm 20 and winch handle 22 rotatably connected to one end thereof are provided to operate the driving gear 14 and provide additional leverage in operating the hand winch 10. A pawl 24 is pivotally mounted on the bracket 12 above the driving gear 14 and engageable therewith at two separate positions. The pawl 24 is pivotally mounted on a shaft 26 connected by means of a screw 28 to the mounting bracket 12.

An elongated spring member 30 engages around and against a collar 32 which abuts one axial end of the driving gear 14. The spring 30 includes cam surface sections 34 and 36 which cooperate with a pair of cams 38 and 40 rigidly connected to the pawl 24 and projecting outwardly therefrom.

The pawl 24 includes a first gear-engaging tooth 42 and a second gear-engaging tooth 44 and an intermediate section 45 integral therewith. A pawl handle 46 integral with the pawl 24 is provided for pivoting the pawl to a desired location. In the first position of the pawl 24 as shown in FIG. 2, the first engaging tooth 42 is engaged with the teeth of the driving gear 14. In this position, the indentations of the cam section 36 of spring 30 tend to hold the cam 40 and therefore the pawl 24 in this fixed position. As may be seen in FIG. 2, the driving gear 14 may be rotated counterclockwise with the first tooth 42 of pawl 24, skipping into and out of engagement with the various teeth of the gear 14 as it is rotated counterclockwise. Clockwise movement of the gear 14 is prevented by the configuration and location of the pawl 24, first tooth 42 and driving gear 14. The handle 46 may be raised from the position shown in FIG. 2 into a second position where the second tooth 44 engages with a tooth of the gear 14, with the cam surface 34 acting together with the cam section 38 to hold the pawl 24 in fixed position. In this configuration, the tooth 44 engaging with teeth of the gear 14, the driving gear may be operated in a clockwise direction and counterclockwise rotation is prevented.

The handle 46 may also be moved into a third position (approximately horizontal) in which neither tooth 42 nor tooth 44 engages with the teeth of gear 14. This is the free-running position in which the driving gear 14 and the reel 18 of the winch 10 may be operated in either direction.

The prior art ratchet and pawl arrangement as shown in FIGS. 1 and 2 is generally effective for the intended purpose of permitting forward, reverse and free-running operation of the winch. However, the pawl 24 has a relatively large mass (including not only the teeth 42 and 44 and intermediate section 45, but also a handle 46) which, as previously described, increases the noise during operation and prevents the pawl from following the gear teeth of the driving gear 14 as closely as desirable. Also, rapid operation of the winch 10 can cause the pawl to jump out of engagement with the gear 14. Once this occurs, the spring 30 maintains the pawl 24 in disengaged position and does not act to bias the pawl towards return engagement with the gear 14.

Also, when the pawl 24 is disengaged, an upward or downward force exerted on the handle portion 46 thereof can cause the pawl 24 to be accidentally engaged with the gear 14, causing damage to the components of the system. The present invention is designed specifically to alleviate the problems generated by the prior art ratchet and pawl device.

Figure 7:
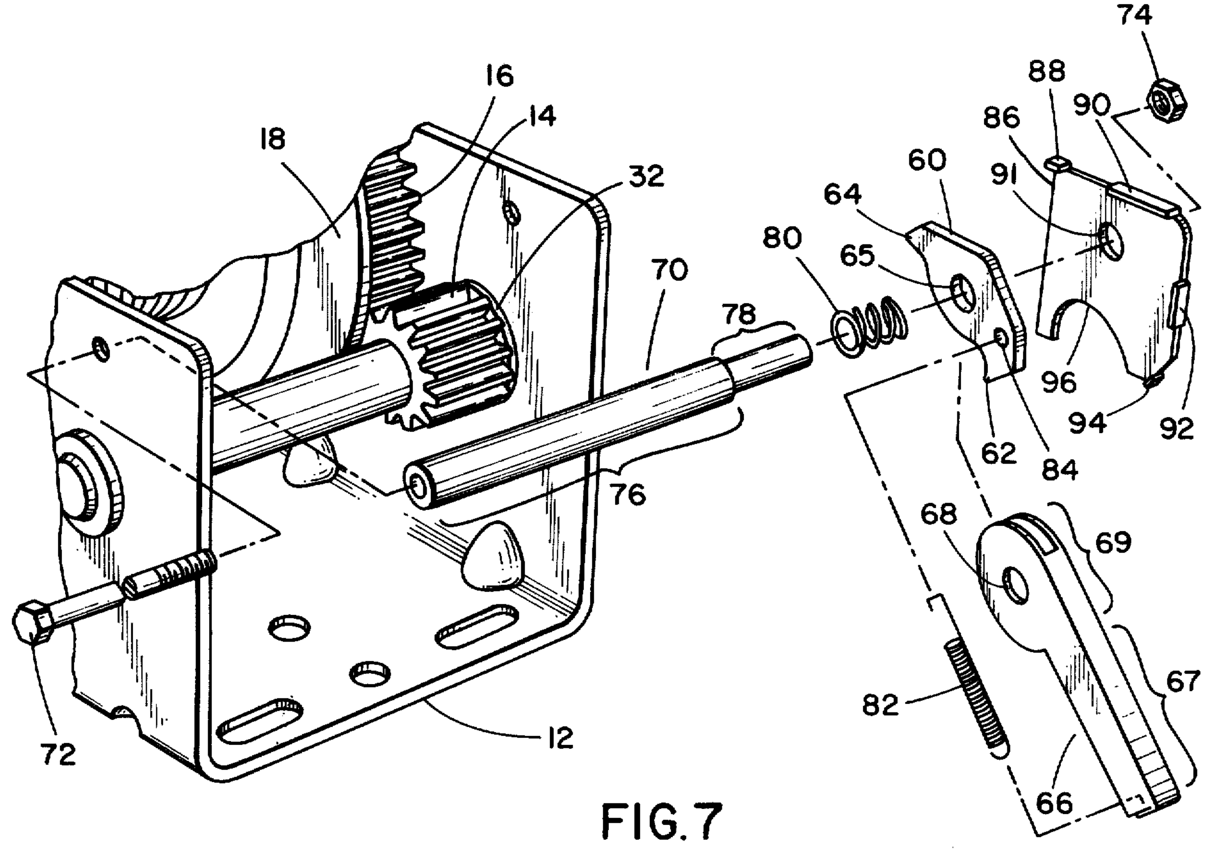
FIG. 7 is a side perspective view of a hand winch on which this invention may be used and a side perspective exploded view of the ratchet and pawl assembly of this invention.

Referring more specifically to the exploded perspective view of FIG. 7, the ratchet and pawl apparatus of this invention includes a pawl 60 having a first gear or ratchet-engaging tooth 62 and a second ratchet-engaging tooth 64 on the opposite end thereof. An aperture 65 is defined on the pawl 60 and is adapted to receive a shaft so that the pawl 60 may be pivoted about the shaft.

A pawl-pivoting means 66 is provided and adapted to receive the pawl 60 therein. The pawl-pivoting means 66 takes the form of a handle and includes a handle section 67 and pawl guard sections 69. Apertures 68 are defined in the pawl guard sections 69 and are adapted to receive a pivoting shaft so that the handle may be pivoted about the shaft. An annular spacer sleeve 70 is provided and connectable between opposite sides of the mounting bracket 12 by means of a screw 72 and nut 74. The spacer sleeve 70 includes a main section 76 and a neck section 78 of lesser diameter than the main section 76. The neck section 78 functions as a shaft about which the pawl 60 and handle 66 may be pivoted or axially translated as will be described more fully hereafter.

A means for biasing the handle 66 is provided and takes the form of a coiled spring 80. A second spring 82 is also provided and connectable at one end in a second aperture 84 defined in the pawl 60 and at the other end thereof connectable to the operating end of the handle 66. The function of spring 82 and the overall components will be more fully described hereafter.

A latching means taking the form of a latch plate 86 is provided for maintaining the pawl-pivoting means or handle 66 in a fixed position when the handle 66 is in contact with the latch plate 86. Stop members 88, 90, 92 and 94 are defined on the latch plate 86 and project outwardly therefrom along the top and side edges thereof. The bottom portion of the latch plate is an arcuate edge 96 which is adapted to conform over the circular washer spacer member 32 separating the driving gear 14 from the mounting bracket 12.

The pawl 60 is shown in a first position (in FIGS. 3 and 4), with the first tooth 62 of pawl 60 in engagement with the teeth of the driving gear 14. In this position the driving gear may be rotated clockwise (viewed from FIG. 4); however, counterclockwise rotation is prevented. When assembled, the spacer member 70 is connected by means of the screw 72 to the vertical plate portion of the mounting bracket 12, with the coiled spring 80 on the neck section 78 of spacer member 70. The spring 80 is biased against the handle 66 and compressed between the handle 66 and the spacer member 70. The spring 80 biases the handle 66 against the latch plate 86. The latch plate 86 is also suspended by means of an aperture 91 on the neck section 78. The arcuate surface 96 abuts against the circular washer 32 to prevent movement of the latch plate 86. When assembled, the pawl 60 and handle 66 are pivotal not only in relation to the mounting bracket 12, but also in relation to each other along the shaft formed by the neck 78.

Figure 3:
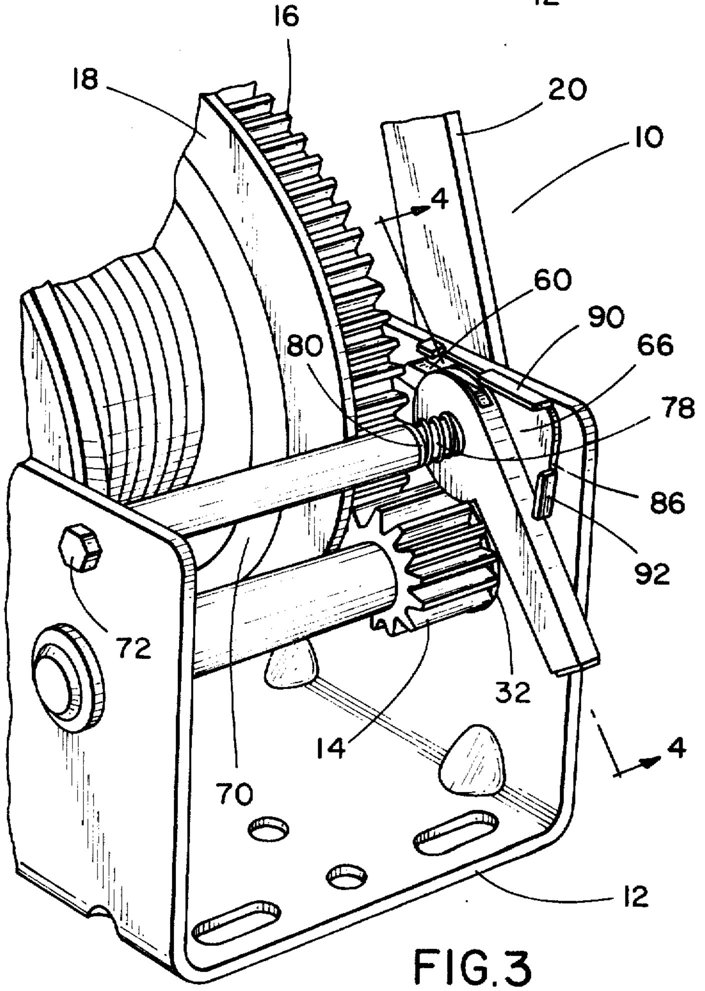
FIG. 3 is a side perspective view of the ratchet and pawl arrangement of the present invention with the pawl in a first position.
Figure 4:
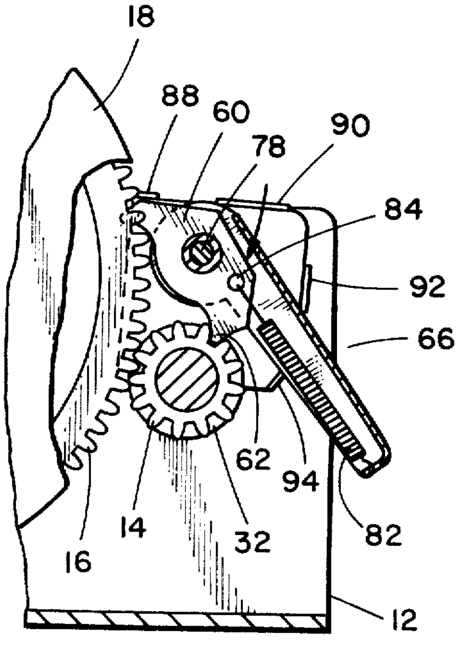
FIG. 4 is a side perspective view of the ratchet and pawl assembly of FIG. 3 taken substantially along the lines 4—4.
Figure 6:
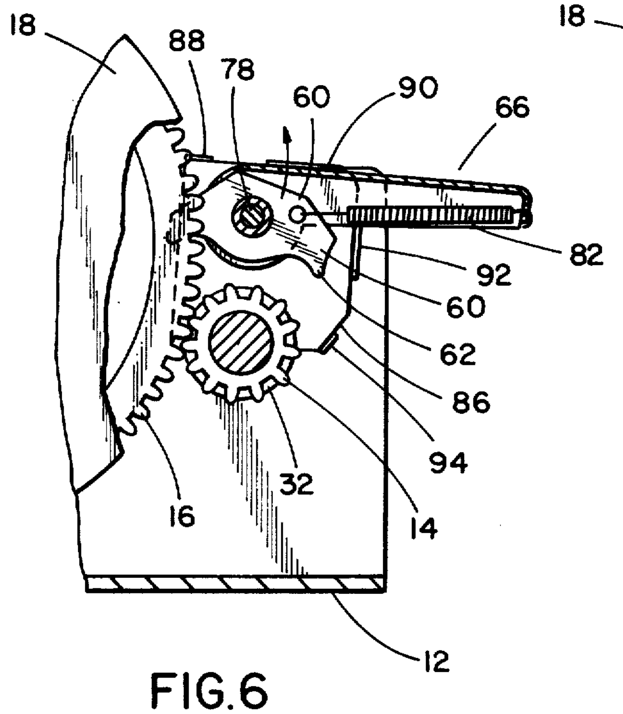
FIG. 6 is a side cross-sectional view of the ratchet and pawl assembly of this invention with the pawl in a third position.

When the handle 66 is in the first position shown in FIGS. 3 and 4, it is held against the latch plate 86 by means of the biasing spring 80. In this position, the stop members 92 and 94 abut against the upper and lower portions of the handle 66 and prevent it from being pivoted about the shaft 78. The second spring 82 is connected between one end 96 of the handle 66 and the aperture 84 of the pawl 60. As described above, the pawl 60 may be pivoted with respect to the handle 66. When pawl 60 is pivoted relative to handle 66, the spring 82 exerts a biasing force tending to return the pawl 60 to a position in which the longitudinal axis of the spring 82 intersects the axis of rotation of the pawl 60 (see FIG. 6). This continuous biasing force smooths the operation of the pawl 60 when the winch 10 is actuated. For example, when the gear teeth 14 are rotated clockwise, the first tooth 62 of pawl 60 is moved into and out of engagement with the various teeth of the gear 14, with the spring 82 always acting to return the first tooth 62 of pawl 60 into engagement with the next set of gear teeth of gear 14.

Figure 5:
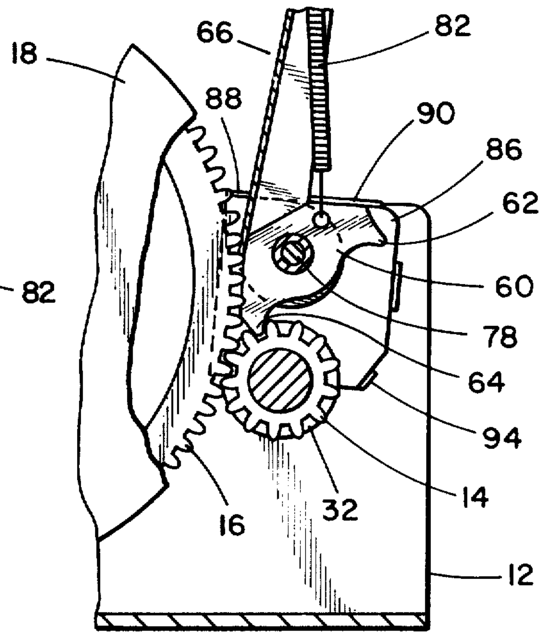
FIG. 5 is a side cross-sectional view of the ratchet and pawl assembly of this invention with the pawl in a second position.

In order to pivot the handle 66 and pawl 60 from one position to another, the operator must first grasp the handle 66 and axially translate it away from the latch plate 86 and toward the spring 80 with a biasing force sufficient to overcome the spring bias. After axial translation of the handle 66 away from the latch plate 86, the handle 66 may then be raised from the first position to a second position, shown in FIG. 5. The handle 66 is then translated against the latch plate 86 by the spring 80.

In the second position, the handle 66 is approximately vertical and the second tooth 64 of pawl 60 engages with the gear teeth of gear 14. Also, the pawl 60 has been rotated clockwise relative to handle 66, causing the spring 82 to urge the second tooth 64 into contact with gear 14. The gear 14 may be rotated counterclockwise; however, clockwise movement of the gear 14 is prevented. As this is done, the tooth 64 rides into and out of engagement with the teeth of gear 14, thus pivoting the pawl 60 back and forth, toward and away from the gear 14, with the spring 82 returning the tooth 64 into engagement with gear 14. In this position, stop members 88 and 90 prevent pivotal movement of the handle 66.

The handle 66 may also be moved to a third position in which the handle 66 is approximately horizontal and the pawl 60 and teeth 62 and 64 are disengaged from the gear 14, permitting free movement of the winch 10 in both rotational directions. In this position, the handle 66 is rotationally fixed between stop members 90 and 92 of the latch plate 86.

As may be seen by a comparison, the pawl 60 is of a substantially lower mass than the prior art pawl 24 since no handle portion is included on the pawl 60. Also, the pawl 60 is pivotal in relation to the handle 66, with the spring 82 acting to continually bias the pawl into engagement with the driving gear 14. The handle 66 is positively held in any of three predetermined positions and cannot be accidentally moved out of the desired position.

While in the foregoing there has been described a preferred embodiment of the present invention, it should be understood that this embodiment is merely illustrative of the invention and that other embodiments of this invention may be made without departing from the true spirit and scope thereof.

What is claimed is:

1. In a winch having a winch reel, a driving gear, a driven gear engaging with the driving gear connected to the winch reel, and a ratchet and pawl apparatus for permitting forward and reverse movement of the winch, said pawl having first and second ratchet-engaging members thereon and pivotal on a shaft into a first position permitting winch rotation in only one rotational direction and into a second position permitting winch rotation in only the opposite rotational direction, an improvement in the ratchet and pawl arrangement comprising, in combination:

handle means for pivoting said pawl into said first and second positions, said handle means mounted for translational and rotational movement on the shaft, latching means for engaging with said handle means and maintaining said handle means in fixed position when in contact with said handle means; and biasing means for translating said handle means against said latching means whereby the pawl is maintained in the desired position until a deliberate translational force is exerted on the handle means sufficient to overcome the force of the biasing means.

2. The improvement as set forth in claim 1 wherein said handle means comprises a handle mounted for pivotal movement with said pawl, said pawl being pivotal in relation to said handle, and means connecting said pawl to said handle whereby, when said handle is pivoted, the connecting means causes the pawl to be pivoted therewith.

3. The combination as set forth in claim 2 wherein said connecting means is a spring connected to the handle and eccentrically connected to said pawl whereby, when said handle is rotated, the spring exerts torque on the pawl, causing the pawl to be flexibly rotated with the handle.

4. The combination as set forth in claim 2 wherein said handle includes an elongated handle section and a pawl guard section and in which said connecting means is connected between the outer end of the handle and the pawl, whereby the connecting means and pawl may be isolated from debris and adverse weather and whereby an operator may grasp the handle to move said pawl at a location remote from the gears.

5. The improvement as set forth in claim 1 wherein said biasing means comprises a spring compressed between a fixed member and the handle means.

6. The improvement as set forth in claim 1 wherein said biasing means includes a spiral coiled spring and a collar spacer member having a main section and a neck section radially smaller than the main section, with the pawl and handle means pivotal on the neck section and the spring wrapped about the neck portion and compressed between the handle means and the end of the main section adjacent the neck section.

7. The combination as set forth in claim 1 wherein the latch means comprises a plate mounted in fixed position adjacent the handle means, said plate including a plurality of stop members projecting therefrom and adapted to engage against and hold the handle means in any of a plurality of predetermined positions.

8. In a winch having a winch reel, a driving gear, a driven gear engaging with the driving gear connected to the winch reel, and a ratchet and pawl apparatus for permitting forward and reverse movement of the winch, said pawl having first and second ratchet-engaging members thereon and pivotal on a shaft into a first position permitting winch rotation in only one rotational direction and into a second position permitting winch rotation in only the opposite rotational direction, an improved ratchet and pawl arrangement comprising, in combination:

- a pawl having first and second gear-engaging teeth thereon;
- means for pivoting said pawl into a plurality of predetermined positions, said pawl-pivoting means pivotal on the shaft; and
- a flexible connecting means connected between said pawl-pivoting means and said pawl whereby, when said pawl-pivoting means is rotated about said shaft, said connecting means exerts torque on said pawl, causing the pawl to be flexibly rotated with said pawl-pivoting means.

9. The improvement as set forth in claim 8 wherein said connecting means is a spring.

10. The improvement as set forth in claim 8 wherein said pawlpivoting means includes an elongated handle section covering said connecting means and a pawl guard section.

* * * * *